Nov. 5, 1940.  T. E. TORKELSON  2,220,500

CHARACTER RECORDING SYSTEM

Filed Aug. 3, 1938  9 Sheets-Sheet 1

INVENTOR.
Torkel E. Torkelson
BY
ATTORNEY

Nov. 5, 1940.  T. E. TORKELSON  2,220,500
CHARACTER RECORDING SYSTEM
Filed Aug. 3, 1938  9 Sheets-Sheet 2

INVENTOR.
Torkel E. Torkelson
BY
ATTORNEY

Nov. 5, 1940.　　　T. E. TORKELSON　　　2,220,500
CHARACTER RECORDING SYSTEM
Filed Aug. 3, 1938　　　9 Sheets-Sheet 3

INVENTOR
Torkel E. Torkelson
BY
ATTORNEY

Nov. 5, 1940.        T. E. TORKELSON        2,220,500
CHARACTER RECORDING SYSTEM
Filed Aug. 3, 1938        9 Sheets-Sheet 4
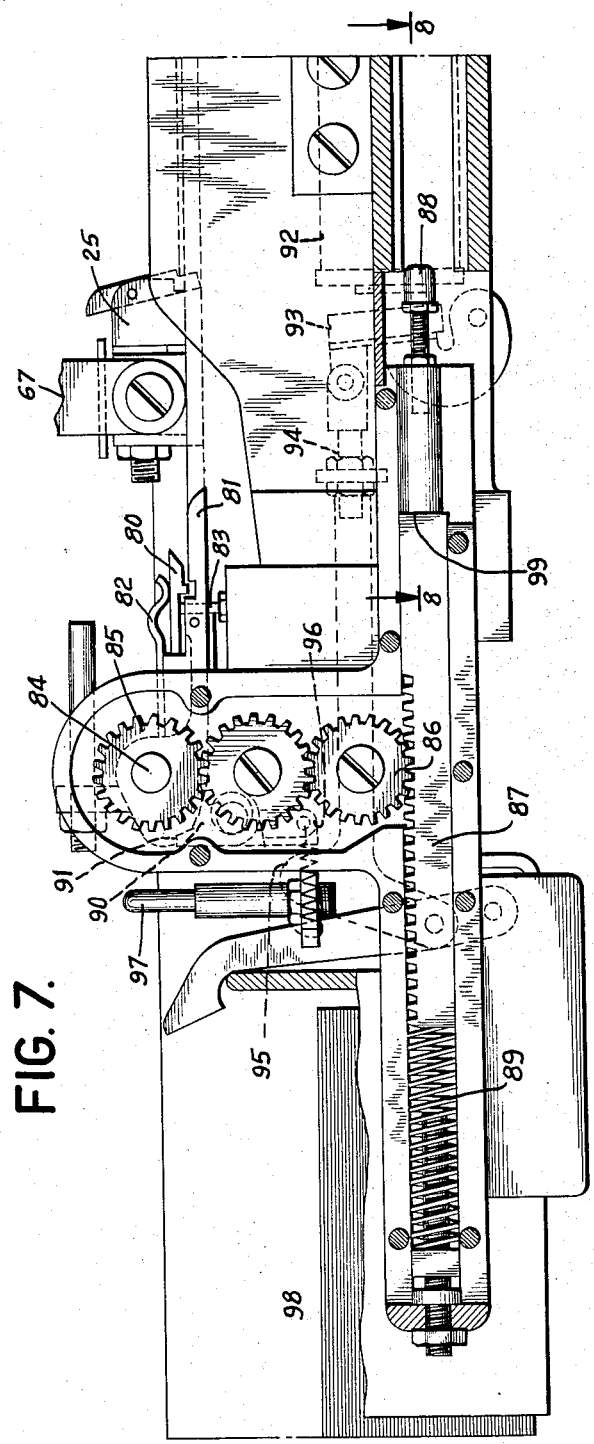
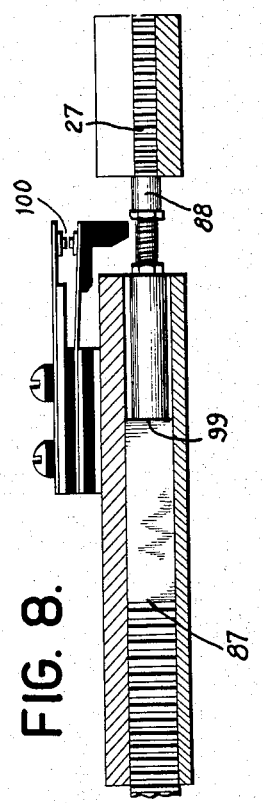
INVENTOR
Torkel E. Torkelson
BY
W. M. Wilson
ATTORNEY Nov. 5, 1940.   T. E. TORKELSON   2,220,500
CHARACTER RECORDING SYSTEM
Filed Aug. 3, 1938   9 Sheets-Sheet 5

INVENTOR.
Torkel E. Torkelson
BY
W. M. Wilson
ATTORNEY

Nov. 5, 1940.    T. E. TORKELSON    2,220,500
CHARACTER RECORDING SYSTEM
Filed Aug. 3, 1938    9 Sheets-Sheet 6

INVENTOR.
Torkel E. Torkelson
BY
ATTORNEY

Nov. 5, 1940. T. E. TORKELSON 2,220,500
CHARACTER RECORDING SYSTEM
Filed Aug. 3, 1938 9 Sheets-Sheet 7

Nov. 5, 1940.    T. E. TORKELSON    2,220,500
CHARACTER RECORDING SYSTEM
Filed Aug. 3, 1938    9 Sheets-Sheet 8

INVENTOR
Torkel E. Torkelson
BY
ATTORNEY

Nov. 5, 1940.  T. E. TORKELSON  2,220,500
CHARACTER RECORDING SYSTEM
Filed Aug. 3, 1938  9 Sheets-Sheet 9

INVENTOR.
Torkel E. Torkelson
BY
W. M. Wilson
ATTORNEY

Patented Nov. 5, 1940

2,220,500

UNITED STATES PATENT OFFICE 2,220,500

CHARACTER RECORDING SYSTEM

Torkel E. Torkelson, Baldwin, N. Y., assignor to International Business Machines Corporation, New York, N. Y., a corporation of New York Application August 3, 1938, Serial No. 222,851

7 Claims. (Cl. 178—17)

The present invention relates to character recording systems wherein code signals are initiated in accordance with the data representations disposed on individual control records to control the character or data recording mechanism.

One of the objects of the present invention resides in the provision of means whereby the coded data representations disposed in columnar areas or fields are presented successively to a sensing station whereat the representations are sensed simultaneously to initiate control signals comprising code groups of impulses initiated successively for controlling the operation of the character registering or recording means.

Another object of the present invention resides in the provision of means whereby the columnar data on the control record is sensed simultaneously to initiate successively code groups of impulses of varying characteristics which are impressed upon a single transmission channel to control the character recording means thereby.

Another object of the present invention resides in the provision of means whereby combinations of control impulses of varying characteristics are initiated, which impulses bear a definite and predetermined relationship to the characteristics of a system conditioning impulse initiated for each character or data representation sensed, the characteristics of said conditioning impulse being constant or similar for each data representation. In accordance with this provision, the signal receiving and selecting circuit arrangement is rendered operative only upon receipt of the system conditioning impulse, and in addition thereto providing the characteristics of the said impulse are equal to the predetermined values assigned thereto, that is, the receiving arrangement is adapted to remain unresponsive to the code impulses in the event the system conditioning impulse characteristics are not of the proper predetermined values.

Still another object of the invention resides in the provision of means whereby the signal receiving arrangement is rendered operative upon receipt of the system conditioning impulse and effective to select individual signaling channels progressively in accordance with the successively received control impulses having varying characteristics.

Still another object of the invention is the provision of means whereby the selected control circuits at the receiving station are maintained energized after the cessation of the selecting signals and rendered deenergized upon receipt of the following selecting signals.

Still another object of the invention is the provision of a plurality of electric discharge devices and means to render them operative in a predetermined progression upon reception and in accordance with the code impulses of varying characteristics and maintain the selected devices operative until receipt of the following selecting signals.

In order to attain the objects set forth, one method is shown in the accompanying embodiment of the present invention, which is merely by way of illustration of a method employing the teachings of the invention, and comprises sensing simultaneously the data representations disposed in different columnar areas on the control record successively to initiate successively code impulses of varying electrical magnitudes and impressing the selecting signals upon a single channel transmission medium to control the operation of a receiving system in accordance with the code impulses to select different control circuits which in turn control the operation of the character recording mechanism.

Provision is made whereby the individual control records are presented automatically to the sensing unit and to render inoperative the sensing and transmitting circuits at the times the control records are presented to and ejected from the sensing unit; that is, means are provided whereby the sensed record is ejected and followed immediately by the feeding of a new control record into a position to be sensed successively by columns. Upon positioning of the control record in the first column position, the sensing and transmitting circuits are rendered operative and maintained so during the successive columnar sensing of the record.

For each of the character or data designating representations sensed code impulses of varying electrical magnitudes are initiated and preceding each group of code impulses a common system conditioning impulse of constant and predetermined magnitude is initiated for each character representation. The selecting circuit arrangement at the receiver is rendered operative upon receipt of the said conditioning impulse only when the value thereof is equivalent to the predetermined electrical magnitude assigned thereto. Receipt of the selecting code impulses is then effective to render electric discharge devices operative progressively depending upon the electrical magnitudes of the selecting impulses. Control circuits for the character recording means are selected by the operated devices and are adapted to be maintained energized upon the cessation of the selecting impulses. Certain of the selected control circuits are deenergized only upon receipt of the succeeding selecting signals, thereby maintaining the character recorder conditioned in accordance with the last character selection effected until the receipt of the next character selecting signal.

In the drawings:

Figs. 7 and 8 are detail views showing the record ejecting mechanism.

Data control record

Figure 1:
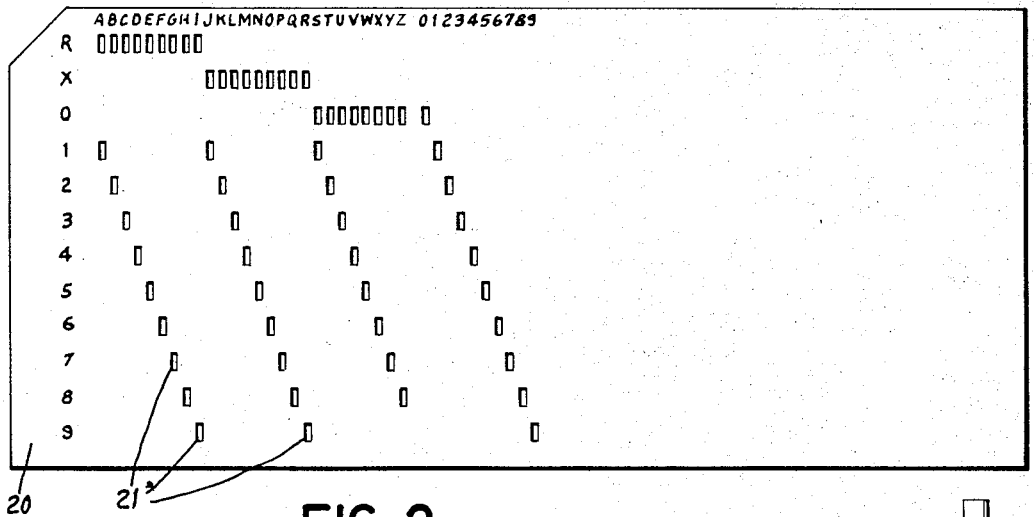
Fig. 1 is a detail of a data control record having coded data representations disposed thereon.

Referring now to Fig. 1, the data control record generally designated 20 is shown to comprise a well known tabulating machine record card of the type quite commonly used in the Hollerith electric tabulating systems. Differentially positioned control representations, such as perforations, are used to represent the various data and character designations. The perforations are differentially positioned in various columnar areas or fields of the record card, and by the differential positioning thereof different data values are imparted thereto. It is seen that the letters of the alphabet are designated by pairs of control representations or perforations, each perforation of a pair being located in one of the twelve index point positions of a columnar area or field. Commonly, the index point positions indicated as R and X are referred to in the tabulating systems as the "twelve" and "eleven" index point positions respectively.

The character code shown in Fig. 1 is quite an arbitrary one and different well known codes which have been used may be employed in the present recording system. It will be noted by reference to the code in the figure that the alphabet is divided into three groups. The letters of the first group A to I are designated by different combinations of a perforation in the R index point position with perforations in the one to nine index point positions. The letters of the second group J to R are designated by perforations in the X position and combination of perforations in the one to nine positions, while the letters of the third group S to Z are identified by combinations of a O perforation with perforations in the one to eight index point positions.

The individual numeral characters are represented by a single perforation in the corresponding zero to nine index point positions. The record cards may have as many columnar areas for the reception of the data indications, such as the perforations 21, as may be desired. The description to be set forth hereinbelow relates to mechanism commonly used in tabulating systems employing the standard eighty column record card.

Record sensing unit

Figure 2:
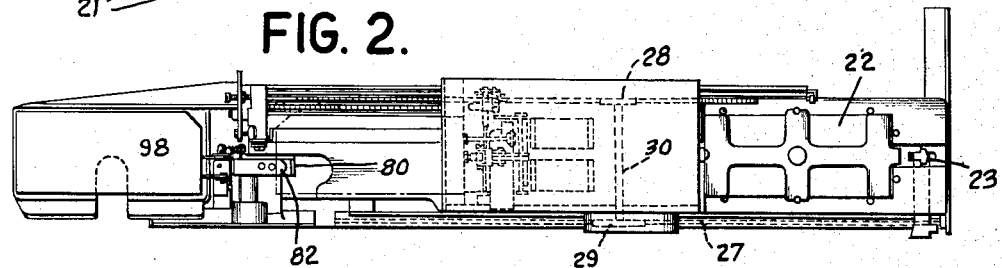
Fig. 2 is a plan view of the record sensing unit.
Figure 3:
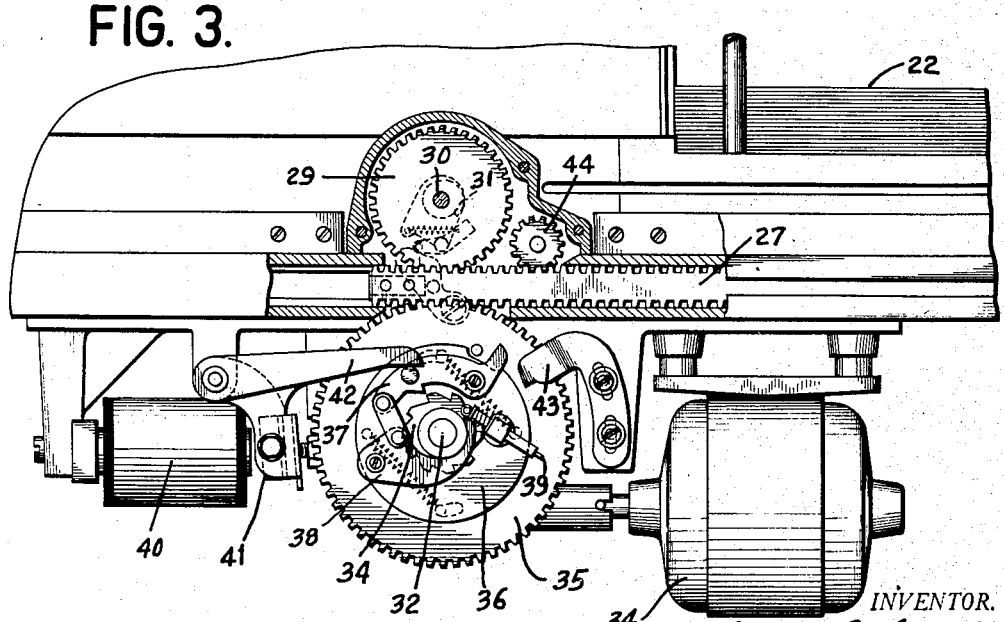
Fig. 3 is a partial side elevation of the sensing unit, broken away to show some of the interior mechanism.
Figure 4:
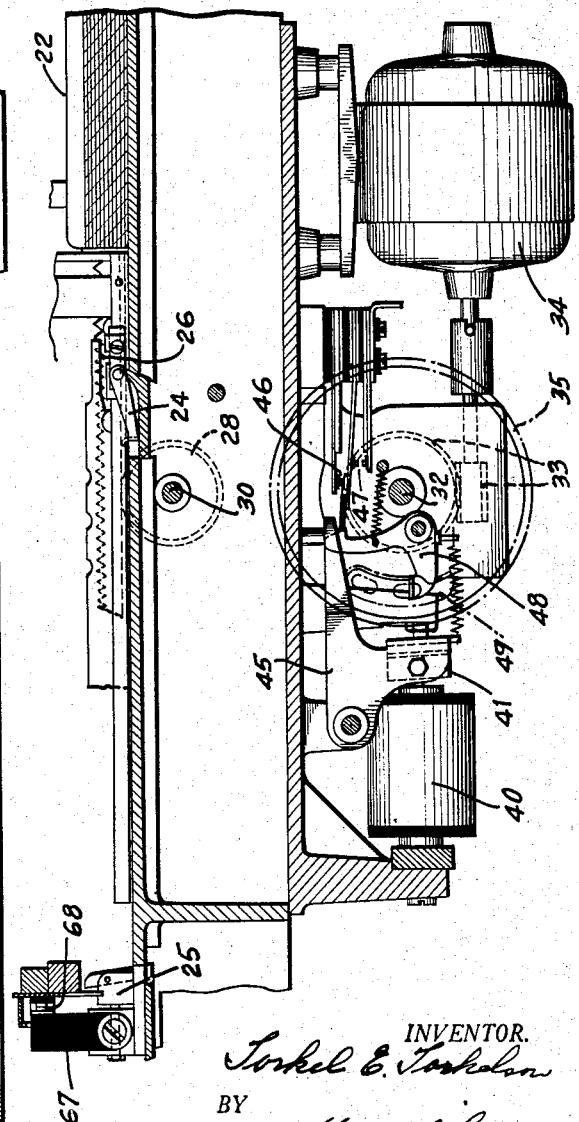
Fig. 4 is a partial central section of the sensing unit.

Record card feeding mechanism.—Referring now to Figs. 2 to 4, the record card feeding mechanism shown is similar to the card feeding mechanism disclosed in the U. S. Patent 1,914,263; therefore, the following brief description thereof is deemed sufficient.

The cards are fed from the supply hopper 22 by picker knife 23 which advances the cards to present their first columnar areas or fields to the sensing position. In this position card carriage pusher 24 and forward guide 25 engage the cards and advance them step by step under control of a well known form of escapement mechanism. Pusher 24 and guide 25 are carried by an escapement rack 26, and picker knife 23 is carried by a rack bar 27. Rack 26 has a gear 28 meshing with its lower edge, and bar 27 has a gear 29 meshing with its upper edge, both gears being mounted on a cross shaft 30. Due to this connection between the elements, movement of picker 23 toward the left as viewed in Fig. 2 is accompanied by movement to the right of pusher 24, and this action will deliver a card from the bottom of the hopper 22 to the sensing position where the pusher engages it for further advancement under control of the escapement mechanism. A one-way clutch mechanism generally designated at 31 in Fig. 3 permits the immediate return to the left of bar 27 and picker 23.

Shaft 32 is adapted to be rotated by suitable gearing generally designated 33 which in turn is driven by a suitably disposed motor 34. Secured to one end of the shaft 32 is a ratchet-shaped clutch element 34. Loosely mounted on the shaft 32 is a gear 35, meshing with teeth on the lower edge of the rack bar 27, and on which gear is mounted a disk 36. Pivotally mounted on the disk 36 is a suitably toothed clutch arm 37, the free end of which is connected to a toggle plate 38 which cooperates with a spring-urged rod 39. In order to effect clutching action, the control magnet 40 is provided with, and when energized attracts, an armature 41 so that the arm 42 is effective to rock the clutch arm 37 into engagement with the ratchet wheel 34. The spring urged rod 39 will hold the clutch arm in engagement with the ratchet teeth clutch element 34. Gear 35 will thereupon be driven in a clockwise direction substantially a single revolution shifting rack bar 27 to the left to feed a card from the supply hopper. This will result as premised before in the movement of pusher 24 to the right to engage the newly fed card. At the termination of the counterclockwise movement of gear 35, a tail of arm 37 will strike the projection 43 secured to a fixed plate to effect disengagement of the clutch arm and the ratchet 34. Gear 35 and rack bar 27 are returned to the position indicated in Fig. 3 through a gear 44 connected to a spring barrel not shown. The one-way clutch 31 permits such action without effecting the escapement rack 26. Also secured to armature 41 is an arm 45, the free end of which is adapted to operate contacts 46 and 47 when the magnet 40 is energized. The contacts are maintained in shifted position by latching bell crank 48, a lug of which is adapted to be engaged by a bent-up plate 49, secured to gear 35, at the termination of the driving movement of the latter.

Figure 6:
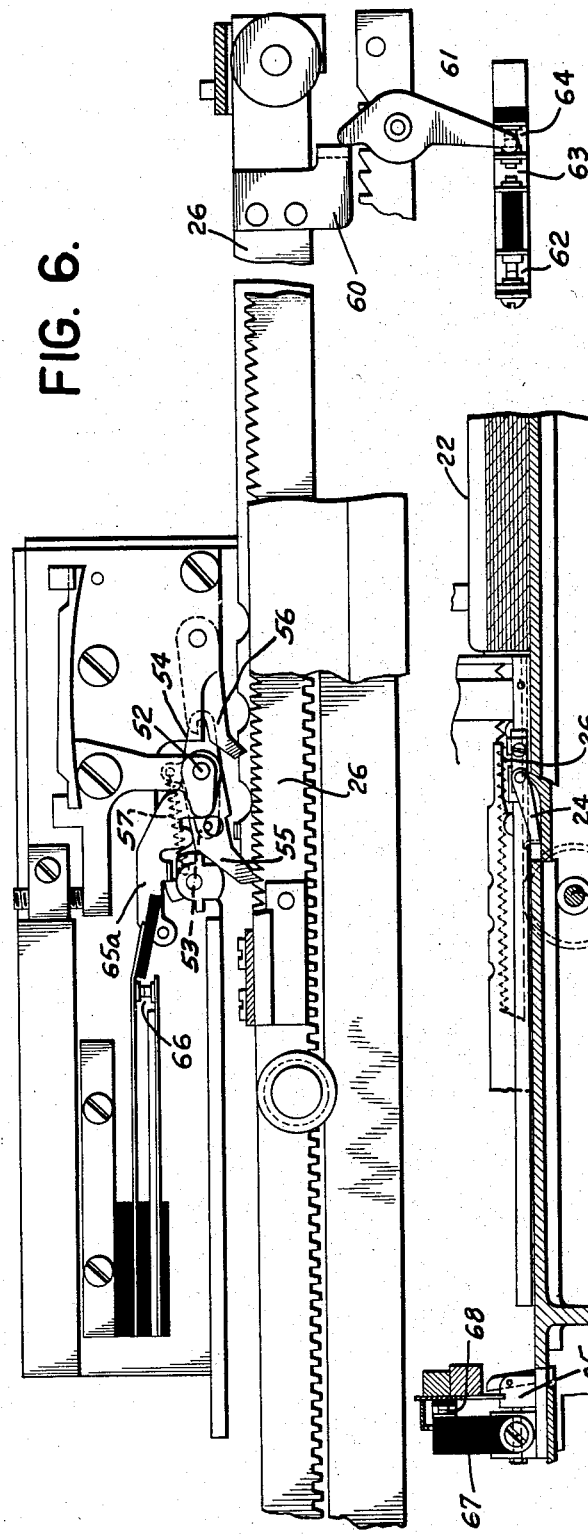
Fig. 6 is a detail view of the escapement mechanism of the sensing unit.
Figure 5:
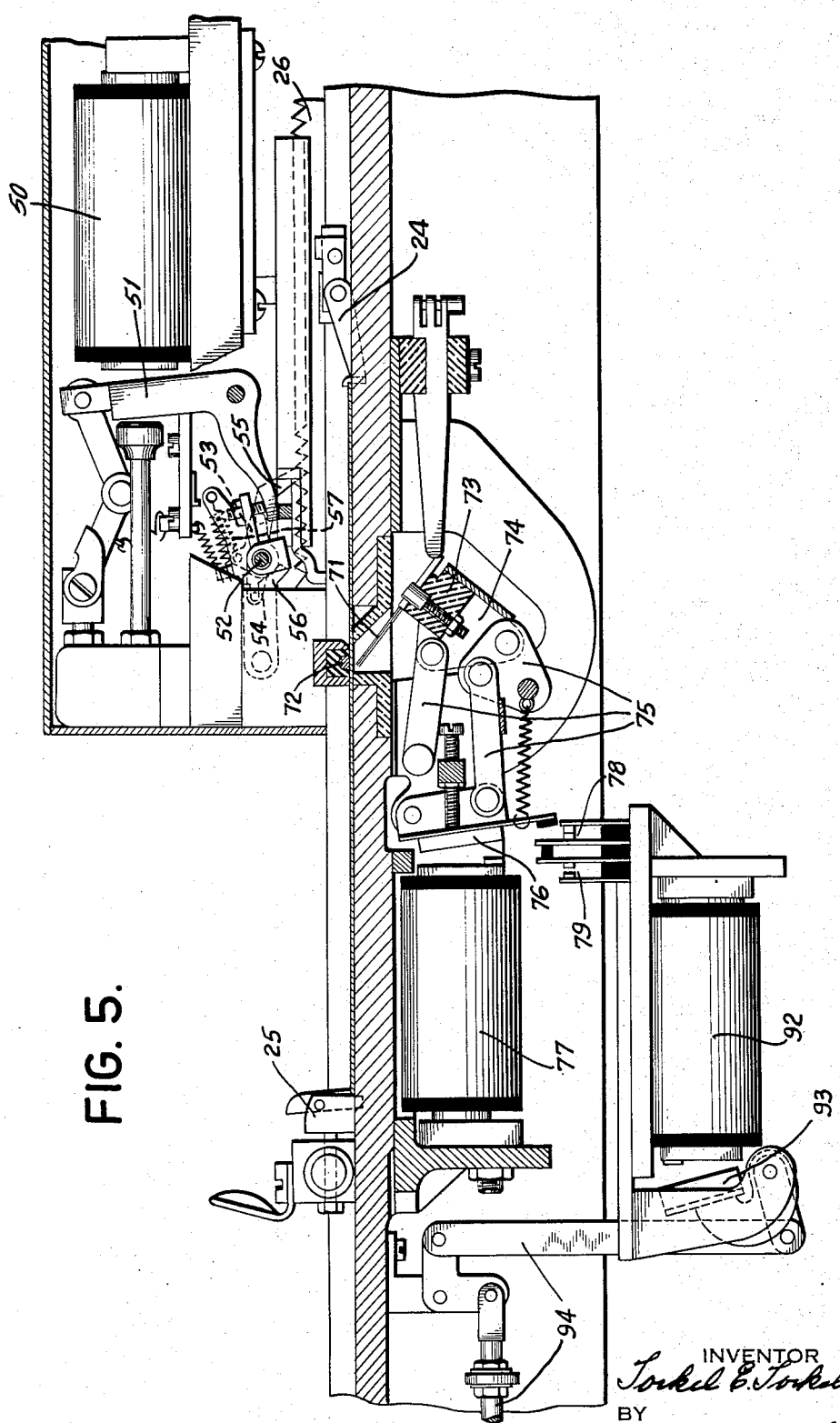
Fig. 5 is a sectional view of the sensing unit showing the sensing brush arrangement.

*Carriage escapement mechanism.*—Referring now to Figs. 5 and 6 wherein the escapement control magnet 50 is shown suitably disposed so as to cooperate with the associated armature 51 to rock the armature upon energization thereof, the armature 51 is adapted to rock the rod 52 which has secured to one end thereof oppositely extending arms 53 and 54 provided with laterally extending pins adapted for engaging enlarged openings in stepping dog 55 and locking dog 56. When the rod 52 is rocked, arm 53 will through its associated pin lift the stepping dog 55 out of one of the notches in the rack 26 and at the same time arm 54 will depress locking dog 56 into a notch between the rack teeth. At this time a spring 57 advances the loosely pivoted dog 55 a short distance but sufficient to permit this dog to move above the top of the next tooth. When the locking dog is again raised, the stepping dog 55 due to the movement of the rack 26 will ride down along the next tooth until it strikes the end thereof when the carriage is thereby arrested. The usual spring drum (not shown) is provided to bias the rack 26 toward the left as viewed in Fig. 5. In Fig. 6 the rack 26 is shown to carry a plate 60 adapted to engage and rock a lever 61 pivoted upon a fixed member of the machine when the last column of the card is in the sensing position. This lever, when so rocked, operates the contacts 62 to 64.

Figure 9:
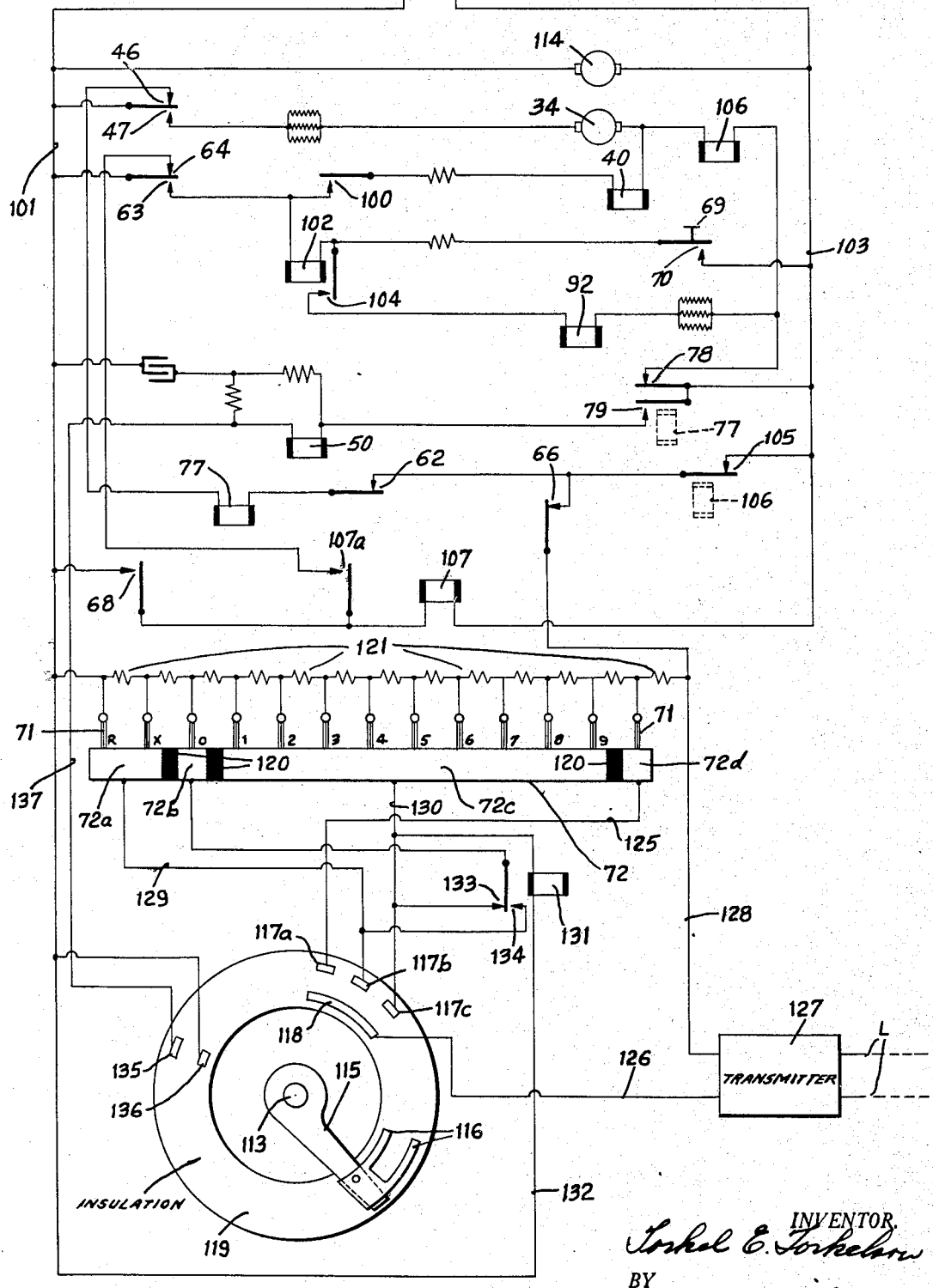
Fig. 9 is a circuit diagram of the signal transmitting arrangement.

In addition thereto, the raising of the dogs 55 and 56 will rock a member 65a cooperating with the contacts 66 to operate these contacts each time the escapement mechanism is operated. In Fig. 4 the card guide 25 is provided with a vertical finger 67 of insulating material which, when the new card is in position to be sensed in the first column, will abut and close contacts 68. A space key 69 shown in Fig. 9 is provided to effect an operation of the escapement mechanism to advance the card one step in the known manner. This mechanism is not shown specifically in the drawings but is shown in detail in the patent referred to hereinabove. The space key operates contact 70 whenever the said key is depressed.

*Record card sensing mechanism.*—Referring now to Fig. 5, a perforated card is shown in position between the guide 25 and the pusher element 24 and as just explained is positioned step by step by the carriage 26 to a sensing position. The sensing mechanism at the sensing position referred to comprises a series of sensing brushes 71 of which there are thirteen adapted to bear against the insulating conducting bar 72. The brushes are carried by an insulating brush holder 73 secured between a pair of side plates with a yoke or bail shaped member 74. The latter is adapted to be rocked by the toggle mechanism indicated generally at 75 which is shown to cooperate with the armature 76 of the magnet 77. Upon energization of the said magnet, the bail-shaped member 74 is elevated resulting in the contact of the individual sensing brushes 71 with the common bar 72. Thus, the brushes 71 are out of engagement with the bar except at such times when the said magnet is energized. Twelve of the brushes make contact with the bar through the perforations in the card, and the other is located beyond the lateral edge of the card for a purpose to be understood as the description progresses. Also, upon energization of the magnet 77, the associated armature 76 is adapted to cooperate with the suitably disposed contacts 78 and 79 to operate these contacts each time the said magnet is energized.

*Record ejecting mechanism.*—Means are provided in the sensing unit for automatically removing the sensed cards and depositing the same in receptacles provided for this purpose. Referring to Figs. 7 and 8, a card gripper mechanism is shown comprising a pair of jaws 80 and 81 urged together by a suitable spring 82 when the abutment of the pin 83 with the upper jaw 80 is not effective to separate the jaws in order that the punched card may be received at the slit-like separation. The card occupies a position between the jaws at the termination of the sensing of the last column of the card. The gripper is pivotally mounted on a shaft 84 to which is secured a gear 85 adapted to be driven by a gear 86 through an idler gear. Meshing with the gear 86 is a slidably mounted rack 87, the extremities of which terminate in an adjustable cylindrical plunger 88. During the previous restoration of the card carriage, the end of rack 27 engages plunger 88 to shift rack 87 to the left against the tension of the spring 89. This causes a clockwise movement of shaft 84 to bring the gripper unit into the position shown in Fig. 7, whereupon a latch lever 90 engages a shoulder 91 of the lower jaw 81. Shifting of the latch lever 90 is effected by energization of the magnet 92 which attracts its armature 93 causing a shifting movement of the linkage generally designated 94 and by means of the cam shoulder 95 an arm 96 secured to the pivoted shaft of the latch lever 90 will rock the latter. This results in the releases of spring 89 to cause the counterclockwise rotation of the gripper unit. As the jaw 80 leaves pin 83, spring 82 will act to close upon the lower jaw 81, thus securely gripping the card and flipping the same in a reverse position. A stationary pin 97 may suitably coact with one of the jaws to separate them, permitting the released card to fall into a receptacle 98. As the card is ejected, shifting of rack 87 by spring 89 causes the square shoulder 99 to engage and close contacts 100.

*Operation of the record sensing unit.*—Referring now to Fig. 9, assume that a supply of record cards is disposed in a hopper 22 and that the spacing key 69 is repeatedly depressed until the card carriage is in the last column position. In this position the contacts 63 are adapted to be closed, establishing the following circuit: from one terminal of the power supply by conductor 101 to contacts 63, coil of relay 102, space key contacts 70, to the conductor 103 connected to the other terminal of the source of supply, thus energizing relay 102 to close the associated contacts 104. A circuit is then completed from conductor 101, contacts 63, coil of relay 102, contacts 104 through the coil of magnet 92, through contacts 78 to the conductor 103 to energize the eject control magnet 92. It should be mentioned that the contacts 78 are closed at this time, since it is remembered that contacts 62 are also operated when the card is in the last column position, thereby preventing the brush magnet 77 from being energized. Upon energization of the ejector magnet 92, the ejecting mechanism is rendered operative but, since no card was assumed to be in the card carriage, ejection of a card is not effected. At the end of the stroke the ejector contacts 100 are adapted to be closed, establishing a circuit via conductor 101 and contacts 63 through the control magnet 40, coil of relay 106, through the contacts 78 to the conductor 103, to effect energization of the control magnet 40 and relay 106. Energization of magnet 40 is effective to trip the clutch lever 42 to cause the clutch element 34 to rotate the gear 35. Energization of the magnet 40 is also effective to operate the contacts 46 and 47 closing the contacts 47 to establish a circuit through the card feed motor 34. Thereupon the operation of the said motor and the associated gears is effective to cause the rack 27 to be displaced to advance a card from the hopper and presenting the first column thereof to the sensing position. At the end of the feeding stroke, the contacts 46 and 47 are adapted to be restored to the normal position shown in Fig. 9 causing relay 106 to be deenergized and permitting the contacts 105 to be closed. Upon displacement of the rack 26 the last column position contacts 62 to 64 are restored to the normal positions shown in the figure. As soon as the card is properly positioned at the sensing brushes and the contacts 46 are again closed, a circuit is established from conductor 101 through the said contacts, through the coil of magnet 77, contacts 62, and contacts 105 to the conductor 103 to energize the brush magnet, thus elevating the brushes 71 to engage the bar 72 whenever a perforation in the card is sensed. Whenever the contacts 47 are open, the card feed motor 34 is deenergized and, as long as the card is in a position so that any column other than the last is presented to the sensing position, the relay 106 is also deenergized to permit the associated contacts 105 to be closed.

Figure 9A:
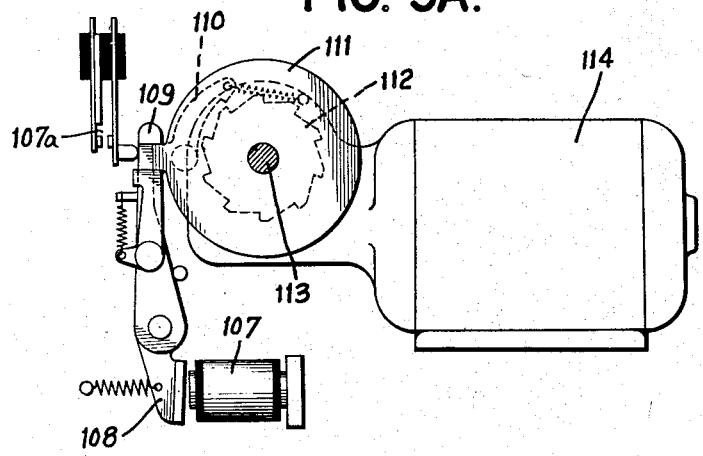
Fig. 9A is a detail view of the transmitting distributor clutch mechanism.

It has been mentioned that contacts 68 are adapted to be closed when the first column of the card is presented to the sensing position. Upon closure of the said contacts, a circuit is established through conductor 101 through the said contacts and through the magnet 107 to conductor 103, energizing the magnet 107. A holding circuit for the said magnet is established through the associated contacts 107a now closed and through the contacts 64 to maintain the magnet energized until the last column of the card is sensed. Energization of the said magnet (see Fig. 9A) is effective to control the armature 108 causing the latching lever 109 to release the pawl 110 and disk 111. Spring urged pawl 110 is then permitted to engage a tooth of the ratchet 112 which is secured to the shaft 13 which in turn is continuously rotated by the motor 114 (see Fig. 9). Disk 111 rotatably mounted on shaft 113 is now caused to rotate with the ratchet 112. An insulated arm 115 fixed to disk 111 carries interconnected conducting brushes 116 which in turn are adapted to engage the individual conducting segments 117a to 117c and 118 disposed on the commutator 119. The method of initiating successively controlled impulses will now be explained.

*Impulse transmission system*

In Fig. 9 the contact bar 72 is shown to be divided into individual conducting segments 72a to 72d, by the insulating portions 120, which in turn are connected to the individual conducting segments 117a to 117c. The individual brushes 71 adapted at certain times to engage the conducting bar 72 are shown to be connected to a potentiometer arrangement 121 so that upon engagement of the individual brushes with the conducting bar 72 different electrical magnitudes, such as current values, are adapted to be impressed upon the transmission channel or medium indicated by the reference character L. Let it be assumed that the lowest value of current is impressed upon the line by the brush disposed farthest to the right as viewed in Fig. 1 and engaging the conducting portion 72d of the conducting bar 72 which is connected to the first conducting segment 117a of the commutator 119; and that the brushes 71 adapted to sense the zero to nine perforations are adapted to impress greater and varying current values upon the line L. The X and R brushes 71 which engage the conducting portion 72a of the conducting bar 72, which is connected to the second conducting segment 117b of the commutator 119, are adapted when engaging the contacting bar to impress different and still greater current values upon the transmission medium L, the purpose of which will be understood as the receiving circuit arrangement is described.

Now let it be assumed that the perforations in the first column of the card when presented to the sensing position are disposed so as to represent the character N. By referring to Fig. 1, it is seen that the code for the character N comprises a perforation in the X index point position and the 5 index point position. Also assume that the distributor arm 115 has just been released due to energization of magnet 107 so as to engage the first conducting segment 117a of the commutator 119. It is now seen that a circuit is established from conductor 101 through the potentiometer 121, the last brush 71, the associated conducting portion 72d of the conducting bar 72, conductor 125, to the first segment 117a of the commutator 119, brushes 116, common conducting segment 118, conductor 126, to a suitable impulse transmitter generally designated 127 and the conductor 128 which is connected to the conductor 103 through the normally closed contacts 66 and 105, thus impressing a signal of a particular value or magnitude upon the transmission medium L. Whenever the transmission medium is a metallic conductor, the differentiating characteristics of the impulses may be in the different current values of the impulses impressed upon the line. If well known types of electronic impulse transmitters are employed, the differentiating characteristics of the impulses impressed upon the medium L may be one of signal amplitude. The first signal of each combination of impulses representing a character will be referred to herein as a system conditioning impulse. This impulse is always initiated through the first conducting segment 117a of the commutator and is always of the same current value or electrical magnitude. The differentiating characteristics of the impulses, such as the different current values referred to, will be referred to from time to time as signals or signal impulses of different or having varying electrical magnitudes. It will be understood that the different current values or current strengths or its equivalents are referred to whenever this expression is used. Upon advancement of the rotary brush arm 115, the brushes are adapted to engage the second conducting segment 117b of the commutator to impress a signal or impulse of different magnitude upon the transmission medium L due to the following circuit now established: from conductor 101, potentiometer 121, the X brush 71, conductor 129, conducting segment 117b, brushes 116, common conducting segment 118, conductor 126, signal transmitter 127, conductor 128 which in turn is connected to the other terminal of the supply source by the conductor 103 through the normally closed contacts 66 and 105. A third impulse of still different magnitude is impressed upon the transmission medium L as the brushes 116 are advanced to engage the third conducting segment 117c of the commutator. By means of the described potentiometer circuit an impulse of a predetermined magnitude is initiated through the brush 71 sensing the perforation at the 5 index point position and engaging the conducting portion 72c of conducting bar 72 which is connected to the third conducting segment 117c by conductor 130 and thus impressed upon the transmission medium.

It is to be noted that the conductor 130 also is connected to a coil of relay 131, the other terminal of which is connected by conductor 132 to one side of the terminal of the supply source by means of conductor 101. This circuit is energized whenever any of the brushes 71 sense a perforation in the one to nine index point positions. Energization of the relay 131 causes the contacts 134 to be closed and the contacts 133 to be opened. This arrangement is provided so that, in the event that a perforation occurs in the zero index point position in combination with any of the one to nine index point positions, the impulse initiated by the zero brush 71 is transmitted by means of the second conducting segment 117b of the commutator. However, in the event that the zero digit is represented by a perforation in the card as a single perforation, it will then be necessary to transmit the impulse initiated by the zero brush by the third conducting segment 117c of the commutator, and at such times, of course, it is obvious that perforations will not occur in the one to nine index point positions, thus rendering the relay 131 inoperative so as to permit the contacts 133 to be closed and connect the conducting portion 72b of the bar 72 which is engaged by the zero brush 71 to the third conducting segment 117c of the commutator.

In this manner the character impulses of varying magnitudes are initiated and impressed upon the transmission medium L. After initiation of the said impulses, the brushes 116 are advanced to engage the segments 135 and 136 to establish a circuit as follows: from conductor 101 to segment 136, brushes 116, segment 135, conductor 137 to the coil of the escapement control magnet 50, contacts 79 to conductor 103, energizing the said magnet 50 effecting escapement of the carriage to position the next column of character perforations to the sensing brushes, whereupon the character signals will be initiated and impressed upon the transmission medium in a manner as just described.

The character signals comprising impulses of varying electrical magnitudes are initiated and impressed successively upon the transmission medium for each of the columns on the card having character data disposed therein in the form of perforations. Upon sensing and transmitting the character signals of the data disposed in the last column of the card, the contacts 62 to 64 are operated by the card carriage to open the brush magnet 77 circuit and the holding circuit for the control clutch magnet 107. Closure of contact 63 causes the ejecting control magnet 92 to be energized, thus ejecting the sensed card and causing the feed clutch magnet 40 to be energized during this operation and also causing a new card to be introduced at the sensing unit and positioned so that its first column is disposed at the sensing station. When the said card is thus positioned, the first column contacts 68 are closed to again energize the control magnet 107 to release the rotary brush arm 115 and by means of the contacts 46 now closed the brush magnet 77 is energized to position the brushes 71 so as to engage the conducting bars 72 whenever a perforation occurs in the said column of the card. In this manner character signals are initiated corresponding to the data sensed in the successively presented control cards to the sensing position.

It was mentioned that for each character signal initiated and impressed upon the transmission medium L that a conditioning impulse always precedes the character impulses and that the said conditioning impulses initiated by the brush 71 constantly engaging the conducting portion 72d of the conducting bar which in turn is connected to the first segment 117a of the commutator. This conditioning impulse is the impulse having the lowest electrical magnitude of the different groups of impulses initiated. Let it be assumed that the electrical magnitude of this impulse is equal to one unit and the electrical magnitude of the impulse initiated by the brush 71 adapted to sense the perforations at the nine index point position is equivalent to two units, the next brush to the left thereof at the eight index point position initiates an impulse of electrical magnitude of three units, etc. In this manner it is seen that the brush sensing the zero index point position initiates a signal of electrical magnitude equal to eleven units, the X brush twelve units and the R brush thirteen units. The purpose of this arrangement will become obvious during the description of the receiving circuit arrangement which will now be described.

*Impulse receiving system*

Figure 10:
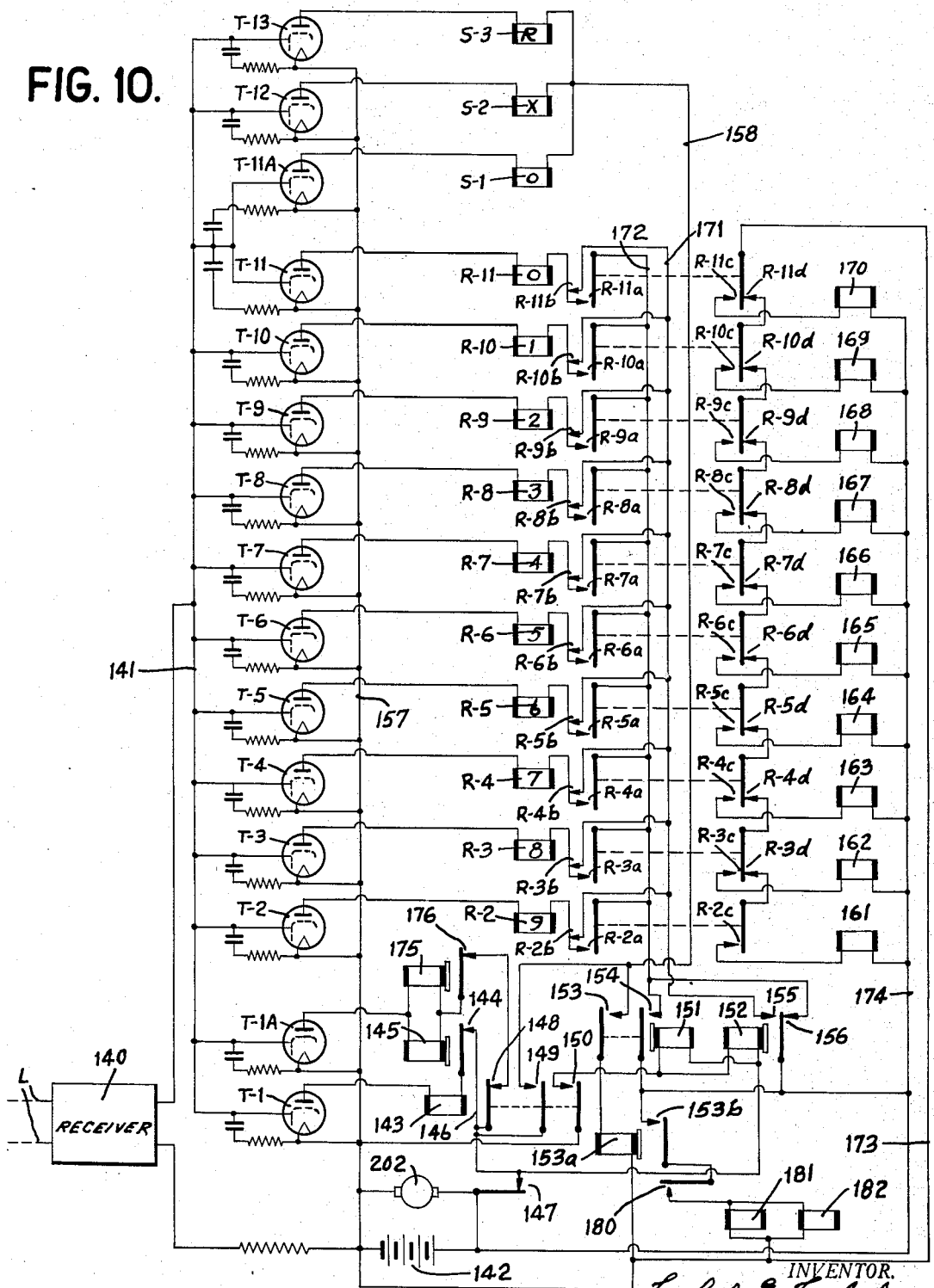
Fig. 10 is a circuit diagram of the signal receiving arrangement.

Referring now to Fig. 10, the impulse receiving circuit arrangement is shown to embody a plurality of electron discharge devices T—1 to T—13, the control grids of which are all connected to a common circuit associated with any suitable known type impulse receiver generally designated 140. The said discharge devices are of the well-known "thyratron" type of tubes, the characteristics of which are such that the tubes remain non-conductive until the grid circuits are so conditioned as to overcome the normal bias impressed thereupon to permit the tubes to become conductive. Irrespective of the conditions impressed upon the control grids, once the tubes are rendered conductive the said control grids effect no further control over the operation of the tubes. In the instant application the anode circuits of the tubes are opened to render the tubes non-conductive at predetermined timed intervals during the operation of the receiving system. The grid biases of the tubes T—1 to T—13 are so arranged that upon reception of a signal of electrical magnitude of one unit, the tube T—1 is rendered conductive, that is, the normal grid bias impressed upon the tube is overcome when a signal of this magnitude is impressed upon the grid circuit of this tube. Tube T—2 is similarly arranged so that the effects of the grid bias are adapted to be overcome by a signal of electrical magnitude of two units. Similarly, tube T—3 is rendered conductive by signals of a magnitude of three units, etc. It is to be noted that in the case of the tube T—1A, the grid bias of this tube is of such value as not to be overcome by a signal of the first magnitude but is adapted to be rendered conductive by any signal greater than the first magnitude, the purposes of which will be explained later herein. Regarding the tube T—11A, the grid bias on this tube is of such value that signal impulses of the eleventh magnitude are effective to operate this tube as well as the tube T—11. The reason for this will be understood presently.

Now to continue with the example chosen in connection with the impulse transmitting system, assume that the first impulse which, as mentioned hereinabove, was designated as the system conditioning impulse is received by the transmission medium L and impressed upon the impulse receiver 140. This impulse is impressed upon the common conductor 141 connected to the grid circuits of the tubes T—1 to T—13 to overcome the conditioning of the grid bias of the tube T—1, thus rendering the said tube conductive. It is understood that the remaining tubes remain unaffected and thus continue to be non-conductive. The following circuit is established upon operation of the tube T—1 from one terminal of the batttery 142, the cathode and anode of tube T—1 to the coil of relay 143, normally closed contacts 144 of relay 145, conductor 146, through the normally closed contacts 147 to the other terminal of the said battery, thus energizing the relay 143, opening the contacts 148 and closing contacts 149 and 150. Through the contacts 150 a circuit is established from one side of the battery 142 therethrough to the coils of relays 151 and 152, through the contacts 147 to the other side of the said battery, energizing the said relays. However, the relays 151—152 are so adjusted and timed as not to be sufficiently energized so as to be effective to operate the associated contacts until shortly after the receipt of the second impulse, the reason for this being that it is necessary according to the present organization of the receiving system to maintain the output circuits of the non-conductive tubes T—2 to T—11 open until the timed interval for the reception of the third impulse. The said output circuits of tubes T—2 to T—11 are shown connected to contacts 155, so that as long as the said contacts are open, tubes T—2 to T—11 cannot be affected irrespective of the magnitude of the signals impressed upon the impulse receiver. Opening of contacts 144 of relay 145 prevents operation of tube T—1A upon reception of any of the following impulses, since relay 143 and tube T—1 remain operated until contacts 147 are opened.

Now assume that the second impulse is received which, as mentioned hereinabove, is initiated by the X brush sensing a perforation in the X index point positions, and, as mentioned hereinabove, this impulse is of the twelfth magnitude, and therefore is effective to operate tubes T—11A and T—12, since this signal value is sufficient to overcome the effects of the grid bias on both of these tubes, establishing a circuit from one side of the battery 142 and by means of conductor 157 through the cathodes and anodes of said tubes to the coils of solenoids S—1, S—2 to conductor 158 to contacts 149 and 147 to the other side of said battery, thus energizing the said solenoids. The said circuits just described are maintained energize until the normally closed contacts 147 are opened, which is effected mechanically after printing has been effected. The operation effected by the said solenoids will be explained when the recording device is described later herein. Since contacts 155 are open, tubes T—2 to T—11 are not affected by the said second impulse.

Immediately after reception of the said second impulse and energization of solenoids S—1 and S—2, the relays 151 and 152 are energized sufficiently to close the contacts 153, 154 and 155, respectively. Now upon receipt of the third impulse which is of the fifth magnitude, tubes T—2 to T—5 are rendered conductive to energize the associated relays R—2 to R—5 by means of the following circuits: from the battery 142 to the conductor 157, cathodes and anodes of tubes T—2 to T—5, coils of relays R—2 to R—5, contacts R—2b to R—5b, common conductor 171, contacts 155, to the said battery, energizing the said relays. The R—2a to 11a and R—2b to 11b contacts are of the make before break type as shown; therefore, upon energization of the R—2 to R—11 relays the anode circuits in which the coils of the said relays are included are transferred from the said "b" contacts to the "a" contacts without breaking the anode circuits. Thus, it is seen upon energization of relays R—2 to R—5 the tubes T—2 to T—5 still remain conductive to continue to energize the coils of the relays through the following circuits: from battery 142, conductor 157, cathodes and anodes of tubes T—2 to T—5, coils of relays R—2 to R—5, contacts R—2a to R—5a, conductor 172, contacts 154 to the battery 142, thus maintaining relays R—2 to R—5 energized.

It should be mentioned here that closure of contacts 153 establishes a circuit therethrough to energize the coil of relay 153a, which is of the slow to energize type, and is adapted to be effective to close the contacts 153b, for purposes to be set forth later, immediately after the energization and operation of one of the solenoids of the group 161 to 170.

The associated transfer contacts generally designated R—2c to R—5c and R—3d to R—5d are operated upon energization of the said relays to establish a circuit to an individual control solenoid of the group of solenoids 161—170. Due to the transfer contact arrangement, it is seen that the control solenoid associated with the relay of the highest order energized in the group, namely, for the example chosen relay R—5, is the only solenoid energized for control purposes. For this reason since relay R—5 is the highest order relay energized, the corresponding solenoid 164 is energized by means of the following circuit: from battery 142 to conductor 173, through the normally closed front contacts R—11d to R—6d to the now closed contacts R—5c to the coil of solenoid 164 to the common conductor 174, to the battery 142, energizing said solenoid. It is seen, since the normally closed or front contacts R—5d are opened, that a circuit cannot be completed to the solenoids 161 to 163 which are associated with relays of the lower order, namely, R—2 to R—4. In this manner, whenever the third impulse is received to trigger off a plurality of tubes T—2 to T—11, energizing a plurality of the corresponding relays R—2 to R—10, the solenoid of the group 161—170 corresponding to the highest order relay of the group R—2 to R—10 energized is the only solenoid which is energized. It has now been described how the printing control solenoids are selected and maintained energized, and in accordance with the example chosen for the character "N" it has been shown that solenoids S—1 to S—2 and 164 are selected and energized in accordance with the signal combination impressed upon the receiving system.

Assume now for the moment that upon selection and energization of the said solenoids that proper character selection is effected in the recording device, and that upon completion of the character selection contacts 180 are mechanically operated by the recorder (this operation will be explained in conjunction with the description of the recording unit).

Closure of contacts 180 establishes a circuit from the battery 142 via contacts 153b, now closed, contacts 180 and coils of the solenoids 181 and 182 to the battery, energizing the said solenoids to effect recording of the selected character and advancement of the record strip.

Contacts 147 are adapted to be operated mechanically upon energization of solenoid 181 to open the circuit for relay 143 thus causing contacts 149 and 150 to be opened. The tube T—1 is now rendered non-conductive upon breaking the associated anode circuit, thus conditioning the tube for further operation upon reception of later conditioning signals.

Opening of contacts 149 renders the tubes T—11A and T—12 non-conductive thus deenergizing the solenoids S—1 and S—2. Opening of contacts 150 causes relays 151 and 152 to be deenergized; however, relay 151 is adjusted to release at a slower rate than relay 152, thus contacts 155 are adapted to be opened and contacts 156 closed before contacts 153 and 154 of relay 151 are opened. The purpose for this arrangement is to provide a closed circuit for the anode circuits of tubes T—2 to T—5 until the contacts 156 are closed which shunt the contacts 154, thus maintaining the said tubes conductive to energize the relays R—2 to R—5 and maintain the selected solenoid 164 energized, even though contacts 154 are opened, until relay 152 is energized by a later signal impulse.

Opening of contacts 153 causes the relay 153a to be deenergized opening the associated contacts 153b thus causing the print and tape feed control solenoids 181 and 182 to be deenergized.

It was mentioned that relay 152 is energized sufficiently after the receipt of the second impulse to operate the contacts 155 and 156. At this time the operated tubes T—2 to T—5 are rendered non-conductive due to opening the anode circuits thereof thus deenergizing the relays R—2 to R—5 and returning this portion of the receiving circuit to normal for further reception of the signals and selection of the relays R—2 to R—11 and solenoids 161 to 170.

Before continuing with the description of the recording device and the control exercised by the said energized solenoids in the recorder, it should be mentioned that in the event the first impulse of the group, namely, the system conditioning impulse is not of the proper magnitude, that is, let it be assumed that the adjustment at the transmitter was such as to initiate an impulse of a magnitude greater than the tube T—1 is adjusted for so that under such conditions not only will the tube T—1 of the receiver be rendered conductive but the tube T—1A will also be rendered conductive. Contacts 144 associated with the relay 145 are adapted to be operated slightly faster than the contacts 148 of relay 143. Therefore, it is seen that relay 143 is prevented from being energized upon reception of a conditioning impulse of too great a magnitude. Instead, however, the relay 175 is energized by means of the following circuit: from battery 142 to conductor 157 to the cathode and anode of tube T—1A, coils of relays 145, 175, contacts 176, 148, and 147 to said battery. Relay 175 is of the slow releasing type and tends to break down the circuit just established and described through coil of relay 145 after a timed interval equivalent to the time required for the transmission of three character impulses, thus preventing faulty operation of the receiving system. Upon proper adjustment of the transmitter and receiver, normal operation of the circuit is effected which is in accordance with the description set forth hereinabove. The character recording device will now be described.

*Character recording unit*

Figure 13:
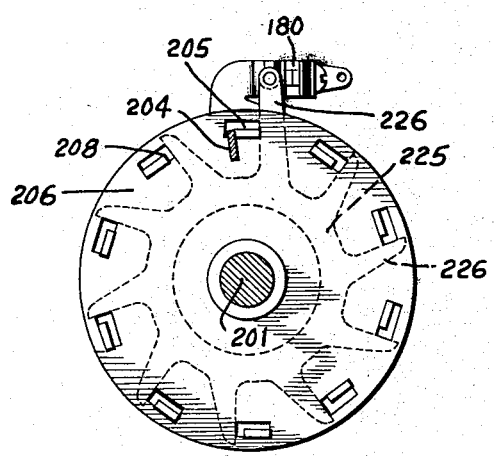
Fig. 13 is a detail section taken along the lines 13—13 of Fig. 12.
Figure 14:
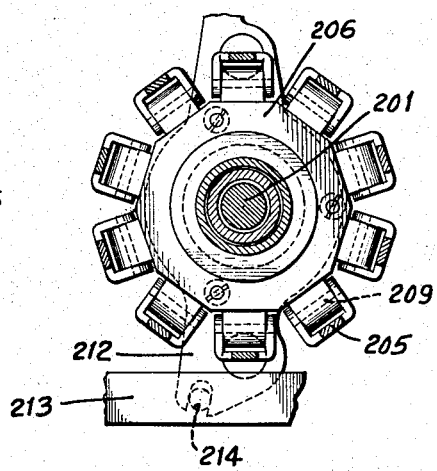
Fig. 14 is a detail section taken along the lines 14—14 of Fig. 12.
Figure 12A:
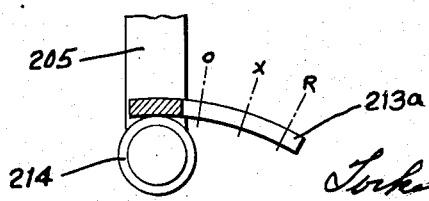
Fig. 12A is a detail view of a stop bar.
Figure 11:
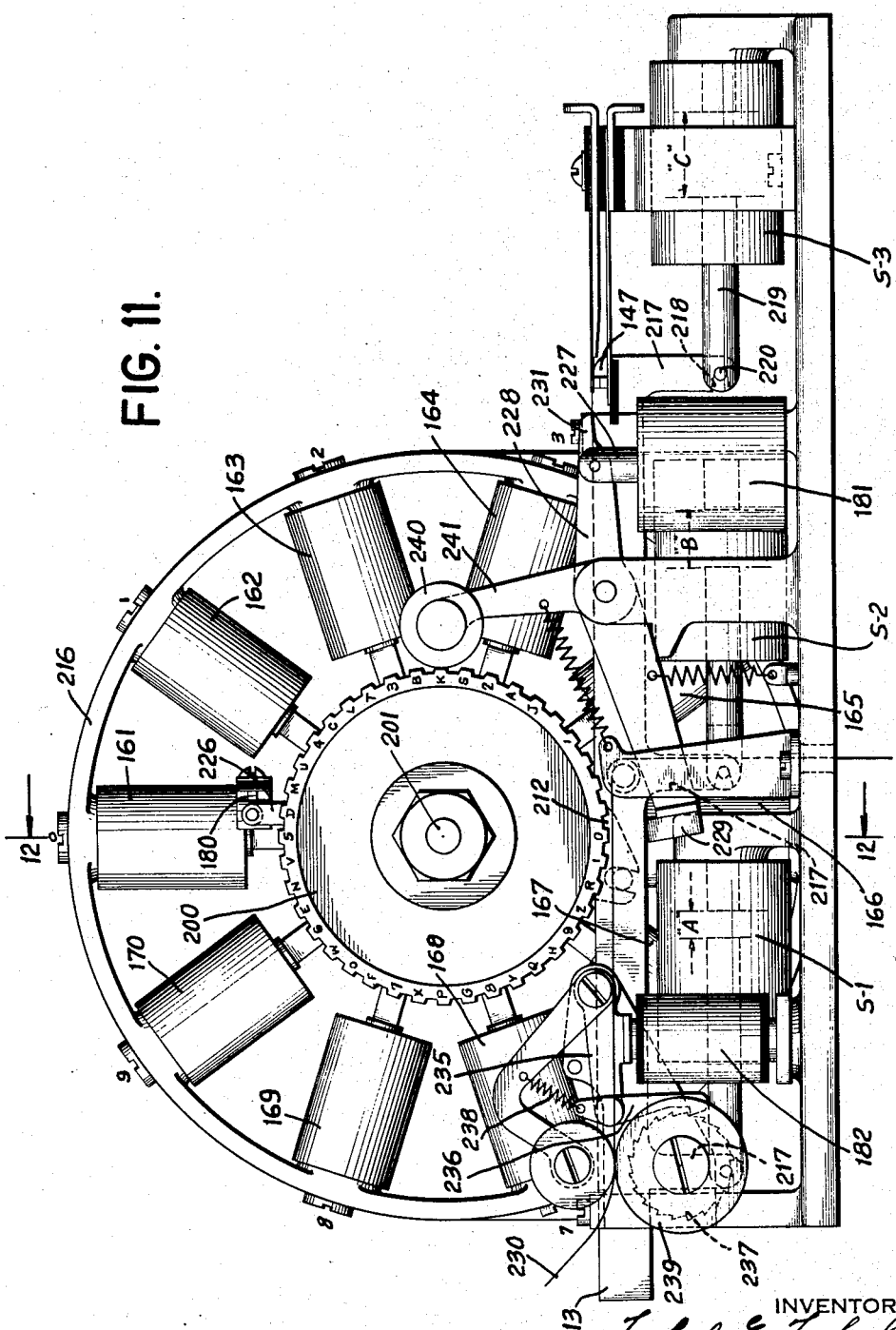
Fig. 11 is a side elevation view of the character recording mechanism.
Figure 12:
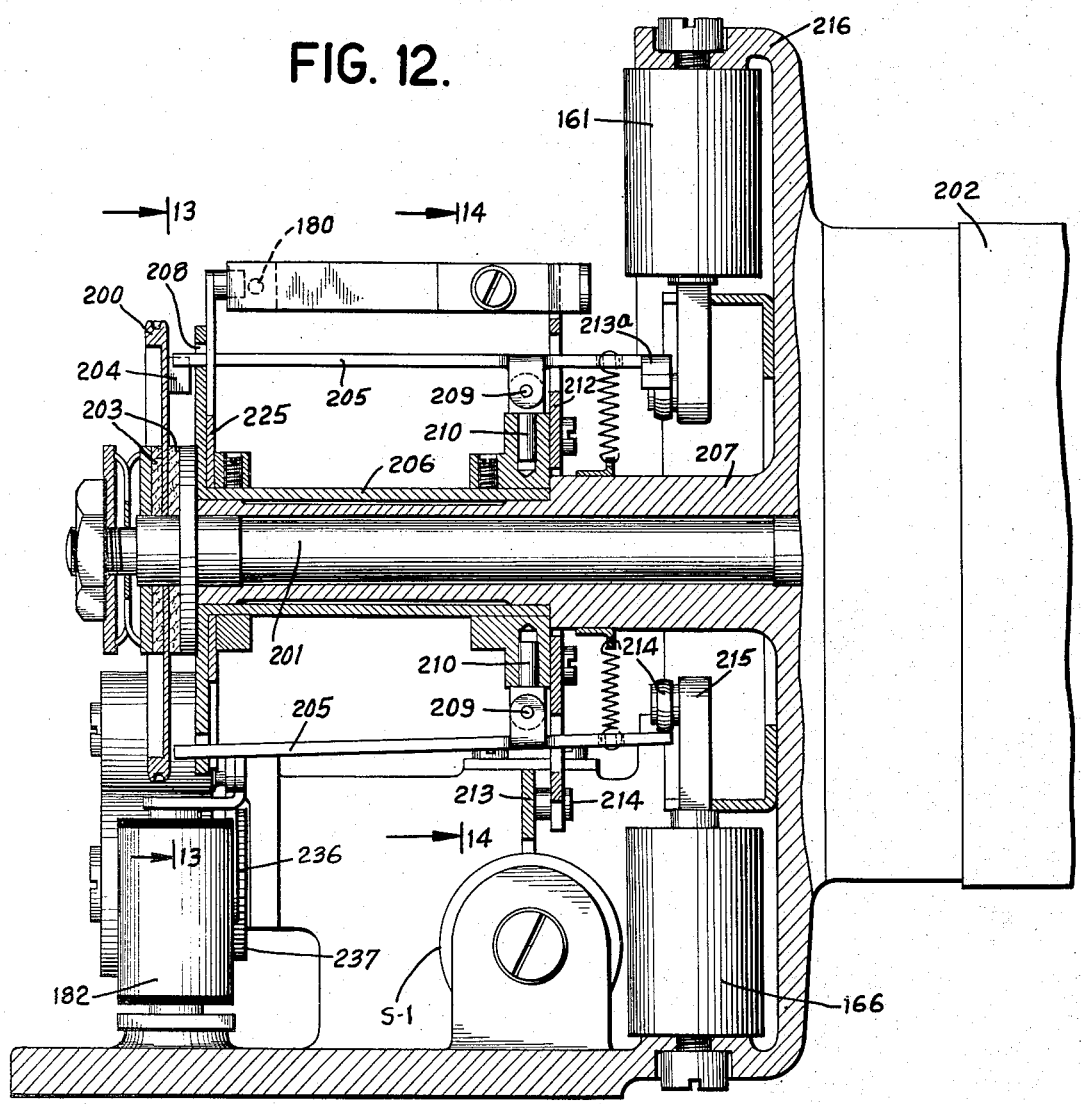
Fig. 12 is a sectional view of the recorder taken along the lines 12—12 of Fig. 11.

Referring now to Figs. 11–14, the character recording unit is shown to comprise a suitable type wheel 200 rotatably supported by shaft 201 which is rotated by a suitably disposed motor 202. The type wheel is adapted to be frictionally driven by the friction disks 203 which are supported by the said shaft. The type wheel 200 is provided with a suitable stop 204 which is adapted to engage any one of the stop bars 205 upon displacement of the stop bars. The said stop bars are supported by a frame generally indicated at 206 which is rotatably supported by member 207. As shown in Figs. 12 and 13, the stop bars 205 are adapted to be arranged concentrically with respect to the shaft 205 in the frame 206. The ends of the individual bars 205 are adapted to extend through oblong openings 208 so as to permit movement of the individual bars 205 in both horizontal and vertical directions. Said bars 205 are shown to be pivoted at 209 in Fig. 12 to permit the stop bars to move into and out of the path of the stop 204 secured to the type wheel. In Fig. 12 the lower stop bar 205 is shown to be in a position so as to be out of the path of the stop 204, whereas the upper stop bar is shown in a position so that one end thereof extends into the path of the stop 204, thus effecting positioning of the type wheel 200. The stop bars 205 are also arranged to be mounted on the frame 206 so that the individual bars can be partially rotated in a horizontal plane about pivots 210. The extent of movement permitted for the positioning of the said bars in both the horizontal and vertical directions is controlled and determined by the oblong apertures or openings 208 referred to hereinabove. It was mentioned that the frame 206 carrying the individual stop bars 205 is rotatably supported by the member 207 and has secured thereto a forked member 212 which is clearly shown in Fig. 14 and which is adapted upon positioning thereof to effect partial rotation or positioning of the frame 206, thus displacing the stop bar unit with respect to the stop 204 on the type wheel. In accordance with the organization of the invention, the forked member 212 is adapted to be positioned by a bar 213 upon which there is disposed a stud 214 adapted to engage directly the forked member 212. The bar 213 is adapted to be positioned in one of three positions. In this manner the stop bar unit is positioned or zoned in one of three positions and in this manner is effective to determine the positioning of the type wheel 200. The stop bars 205 are provided with extensions indicated at 213a which are adapted to cooperate with the rollers 214 supported by the plungers 215 of the solenoid assembly comprising the individual solenoids 161—170. The solenoid assembly is suitably secured to the frame work 216 which may form an integral part of the frame 207 as indicated in Fig. 12. Extensions 213a, a detail of which is shown in Fig. 12A, are adapted to be of sufficient length so that the rollers 214 are in direct engagement at all times with the extensions irrespective of the positioning of the stop bar unit, that is, the roller 214 is adapted to engage the extension 213a at all times, even though the stop bar unit may be in the first, second or third zoning position. It was mentioned that the zoning positions are effected by the positioning of the forked member 212 which in turn is positioned by the bar 213. The bar 213 is provided with three dependent arms 217, each arm being provided with a slot 218. Three zoning solenoids S—1 to S—3 are provided with individual pins 220 which are adapted to be disposed in the said slots 218 of the individual depending arms 217. The said solenoids S—1 to S—3 are adapted to displace the associated plungers 219 different distances, that is, solenoid S—1 is adapted upon energization to displace the associated plunger 219 to the right a distance, let us say, equivalent to that shown in Fig. 12 and indicated by the designation A, whereas solenoid S—2 is adapted to displace its associated plunger upon energization a distance to the right as viewed in said figure equivalent to the distance indicated at B and finally the solenoid S—3 is adapted to displace its associated plunger a distance to the right equivalent to the distance indicated at C. In this manner it is seen that the associated bar 213 is adapted to be displaced differentially depending upon the energization of the solenoids S—1 to S—3. It is seen that the bar 213 is moved farthest to the right as viewed in Fig. 11 upon energization of solenoid S—3 whereas the bar 213 is moved but one-third of the distance upon energization of the solenoid S—1. In this manner positioning or zoning of the forked member 212 and the stop bar unit is effected.

The operation of the recording unit described thus far should be quite obvious at this point. However, to follow through with the example chosen earlier herein, the manner of effecting character selection is briefly as follows: Upon reception of the second impulse, it was mentioned in connection with Fig. 10 that the solenoids S—1 and S—2 were energized due to the operation of the tubes T—11A and T—12. It is now seen that upon energization of said solenoids that the bar 213 is adapted to be positioned two units to the right as viewed in Fig. 11 which, let us assume, is equivalent to the distance B indicated in the said figure. It is seen that the energization in this particular example of solenoid S—1 has no effect upon the final positioning of the bar 213 which is controlled in this case by the energization of solenoid S—2, since the stroke of the associated plunger thereof is greater than that of the plunger of solenoid S—1. Positioning of the bar 213 is effective to position the forked member 212 in a counterclockwise direction, thus displacing the frame 206 carrying the individual stop bars 205, thereby effecting a zoning operation. Upon completion of the described zoning operation, the third selecting impulse is received by the system as described hereinabove to energize the relays R—2 to R—5, effecting energization of the solenoid 164. Energization of the said solenoid 164 is adapted to attract the associated plunger 215 carrying the roller 214, thus causing the associated stop bar 205 to be partially rotated about the pivot 209, thus positioning the free end of the stop bar 205 in the path 204 of the type wheel 200. Upon engagement of the stop 204 with the stop bar 205, the selected character disposed in the type wheel 200 is held in position at the printing position until recording thereof is effected.

It was mentioned that the individual stop bars 205 were also adapted to be rotated in a horizontal plane about the pivot 209. This is effected as follows: As the type wheel 200 comes to rest due to the engagement of the stop 204 with the positioned stop bar 205, the momentum of the type wheel 200 is adapted to urge the displaced stop bar 205 in a clockwise direction as viewed in Fig. 13 for a short distance as determined by the rectangular aperture 208. This partial rotation of the bar 205 is adapted to effect engagement of the said bar with the disk 225 which is rotatably supported on the frame 206 as indicated in Fig. 12. The disk 225 is provided with a plurality of extension fingers 226, each of which is adapted to be directly engaged by the associated displaced stop bar 205 when the bar is urged by the type wheel stop 204. Partial rotation of the disk 225 in a clockwise direction is effective to close the suitably disposed contacts 180 by means of one of the extension fingers 226. The effect of the closure of contacts 180 was described in detail in conjunction with Fig. 10, and it is remembered it is the closure of these contacts that effect energization of the printing control solenoid 181 shown in Fig. 11. Energization of the solenoid 181 causes displacement of the associated plunger 227, thus causing the pivoted arm 228 to be partially rotated in a clockwise direction as viewed in Fig. 11, urging the printing hammer 229 secured to the free end of the printing arm 228 against the record strip 230 and type wheel 200, thereby effecting recording of the selected character upon the record strip. Upon complete displacement of the printing arm 228, the extension finger 231 thereof is adapted to operate the contacts 147 which, as described hereinabove, upon operation are adapted to open the control circuit so as to cause deenergization of the relays 143, solenoids S—1 and S—2 and relays 151 and 152. The solenoid 164 is maintained energized until a further selection is made of one of the solenoids 161—170, in this manner blocking rotation of the type wheel until the following selection has been effected in accordance with the character signals. The printing control magnet 181 is also deenergized as well as solenoid 182. In Fig. 11 solenoid 182 is shown suitably disposed with respect to the armature pivoted at 235, the free end of which carries the pivot pawl 236. Upon energization of the solenoid 182 the armature 235 is attracted, thus urging downwardly the pawl 236 to engage the next tooth in the ratchet 237. Energization of solenoid 182 is effected at the same time that print solenoid 181 is energized. Upon deenergization of solenoid 182 the said armature pawl is restored to the normal position shown in Fig. 11 by spring 238, thus actuating the ratchet wheel 237 and the feeding roll 239 fixed thereto to effect advancement or feeding of the record strip a suitable distance. The type wheel 200 is shown to be in constant engagement with a suitable inking roller 240 secured to a suitable disposed pivoted arm 241. Upon deenergization of any one of the character selecting solenoids of the group 161—170, the disk 225 is displaced in a counterclockwise direction as viewed in Fig. 13 sufficiently by the spring blades of the contacts 180, permitting the contacts 180 to be opened. In this manner it is seen that the recording unit is conditioned to the normal condition in readiness for further printing operations in the manner just described.

The claims of the instant application relate solely to the selecting signal control systems; the character recording device per se is claimed in a separate co-pending application Serial No. 222,852, filed August 3, 1938.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A system of the character described comprising means to initiate code groups of impulses representing different characterizations including means to initiate for each characterization a common impulse of predetermined electrical magnitude, the value of which is the same for each characterization and means to initiate additional impulses of different electrical magnitudes representing the different characterizations, the value of the electrical magnitudes of the said last mentioned impulses bearing a definite and predetermined relationship to the constant value of the electrical magnitude of the said common impulse, and receiving means responsive to and controlled by all of the code impulses in the groups representing the characterizations.

2. A system of the character described comprising means to initiate character signals consisting of code groups of impulses including means to initiate for each character an impulse of similar and predetermined electrical magnitude and additional means to initiate additional impulses of different electrical magnitudes representing the characters, the values of the electrical magnitudes of the last mentioned impulses and the first said impulse bearing a definite and predetermined relationship therebetween, signal receiving means including means responsive to said first mentioned impulse to condition the said receiving means for reception of the said second mentioned impulses, and means controlled by the signal receiving means in accordance with electrical magnitudes of the said additional impulses.

3. A system of the character described comprising means to initiate character signals consisting of code groups of impulses including means to initiate for each character one common impulse of a similar and certain predetermined electrical magnitude and one or more impulses of different electrical magnitudes bearing a predetermined relationship to the electrical magnitudes of the common impulse, signal receiving means including means responsive only to the said common impulse to condition the receiving means for further reception of the additional impulses of the group, a plurality of signaling channels, and means controlled by the second mentioned impulses to control the selection of the individual signaling channels in accordance with the character signals.

4. A system of the character described comprising means to receive code groups of impulses, character recording means having a plurality of electromagnetic control means and control circuits therefor, means controlled by the receiving means to select and energize certain of said control circuits and control means to control the operation of the character recording means, means to maintain the selected circuits and control means energized after cessation of said received impulses, and means to deenergize certain of said selected circuits and control means upon receipt of the succeeding code group of impulses.

5. A system of the character described comprising means to initiate character signals consisting of code groups of impulses including means to initiate for each character a common impulse of a predetermined constant electrical magnitude and one or more additional impulses of different electrical magnitudes, and signal receiving means including means responsive solely to said common impulse when the value of the electrical magnitude of said impulse is equal to the fixed said predetermined value to condition the receiving means for further reception of said additional impulses.

6. A system of the character described comprising means to receive character signals consisting of code groups of impulses, a plurality of control circuits and means controlled by the receiving means to select predetermined control circuits in accordance with the signals, character recording means and electromagnetic control means therefor controlled by the selected control circuits to effect character selection and recording, means to restore the selecting means to a normal condition for further selection operations upon receipt of later character signals, and means to maintain the selected electromagnetic means operated to maintain the last character selection until receipt of the next character signal.

7. A system of the character described comprising means to receive character signals consisting of code groups of impulses including means to be controlled progressively by and in accordance with the code groups of impulses received, character recording means comprising a plurality of control means therefor, means controlled by the progressively controlled receiving means to select certain of said control means rendering the character recording means operative, means to condition the said signal receiving means, upon operation of the character recording means, for further reception of the character signals, and means to maintain operative the selected control means of the character recording means until receipt of the next character selecting signal.

TORKEL E. TORKELSON.